US012716372B2

(12) United States Patent
Saito

(10) Patent No.: US 12,716,372 B2
(45) Date of Patent: Aug. 25, 2026

(54) ENGINE

(71) Applicant: TOYOTA JIDOSHA KABUSHIKI KAISHA, Toyota (JP)

(72) Inventor: Yui Saito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 19/093,288

(22) Filed: Mar. 28, 2025

(65) Prior Publication Data

US 2025/0347236 A1 Nov. 13, 2025

(30) Foreign Application Priority Data

May 7, 2024 (JP) ................................ 2024-075269

(51) Int. Cl.
*F02B 25/06* (2006.01)
*F01M 13/00* (2006.01)
*F02M 35/10* (2006.01)

(52) U.S. Cl.
CPC .. *F01M 13/0011* (2013.01); *F02M 35/10262* (2013.01); *F01M 2013/0044* (2013.01)

(58) Field of Classification Search
CPC .... F01M 13/028; F01M 13/022; F02M 25/06; F02D 2250/08
USPC ........................................................ 123/574
See application file for complete search history.

(56) References Cited

U.S. PATENT DOCUMENTS 3,589,347 A * 6/1971 Sawada ................ F01M 13/025 123/574
3,673,997 A * 7/1972 Sawada .............. F02M 25/0836 123/519
2016/0312686 A1* 10/2016 Christian ............... F01M 13/04
2017/0350286 A1* 12/2017 Rice ................... F01M 11/0458

FOREIGN PATENT DOCUMENTS

JP 2011-185181 A 9/2011

* cited by examiner

*Primary Examiner* — Logan M Kraft
*Assistant Examiner* — James J Kim

(57) ABSTRACT

An engine performs ventilation of blow-by gas by introducing air from an intake passage into a crankcase. The engine includes an air introduction passage that fluidly connects the intake passage to the crankcase, a unidirectional valve attached to the crankcase and configured to restrict a flow of gas from the crankcase toward the intake passage through the air introduction passage, and a coupling passage that guides, into the crankcase, air discharged from the unidirectional valve. The coupling passage extends in the direction that is different from a direction in which air is discharged from the unidirectional valve.

4 Claims, 4 Drawing Sheets

ENGINE

CROSS-REFERENCE TO RELATED APPLICATIONS

This application is based upon and claims the benefit of priority from Japanese Patent Application No. 2024-75269, filed on May 7, 2024, the entire contents of which are incorporated herein by reference.

BACKGROUND

1. Field

The present disclosure relates to an engine that performs crankcase ventilation.

2. Description of Related Art

Japanese Laid-Open Patent Publication No. 2011-185181 discloses a known engine including a ventilation system for crankcase blow-by gas by introducing air into the crankcase from an intake passage. The engine ventilation system disclosed in this publication includes a unidirectional valve that restricts the backflow of gas from the crankcase toward the intake passage.

The blow-by gas contains moisture and oil. The unidirectional valve installed in the engine may be exposed to blow-by gas. When the temperature of the unidirectional valve is relatively low, the moisture in the blow-by gas is condensed inside or around the unidirectional valve, and the condensed moisture is mixed with oil. As a result, emulsion may occur.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

An aspect of the present disclosure provides an engine configured to perform ventilation of blow-by gas by introducing air from an intake passage into a crankcase. The engine includes an air introduction passage that fluidly connects the intake passage to the crankcase, a unidirectional valve attached to the crankcase and configured to restrict a flow of gas from the crankcase toward the intake passage through the air introduction passage, and a coupling passage that guides, into the crankcase, air discharged from the unidirectional valve. The coupling passage extends in a direction different from a direction in which air is discharged from the unidirectional valve.

The engine suppresses the occurrence of emulsion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

Figure 1:
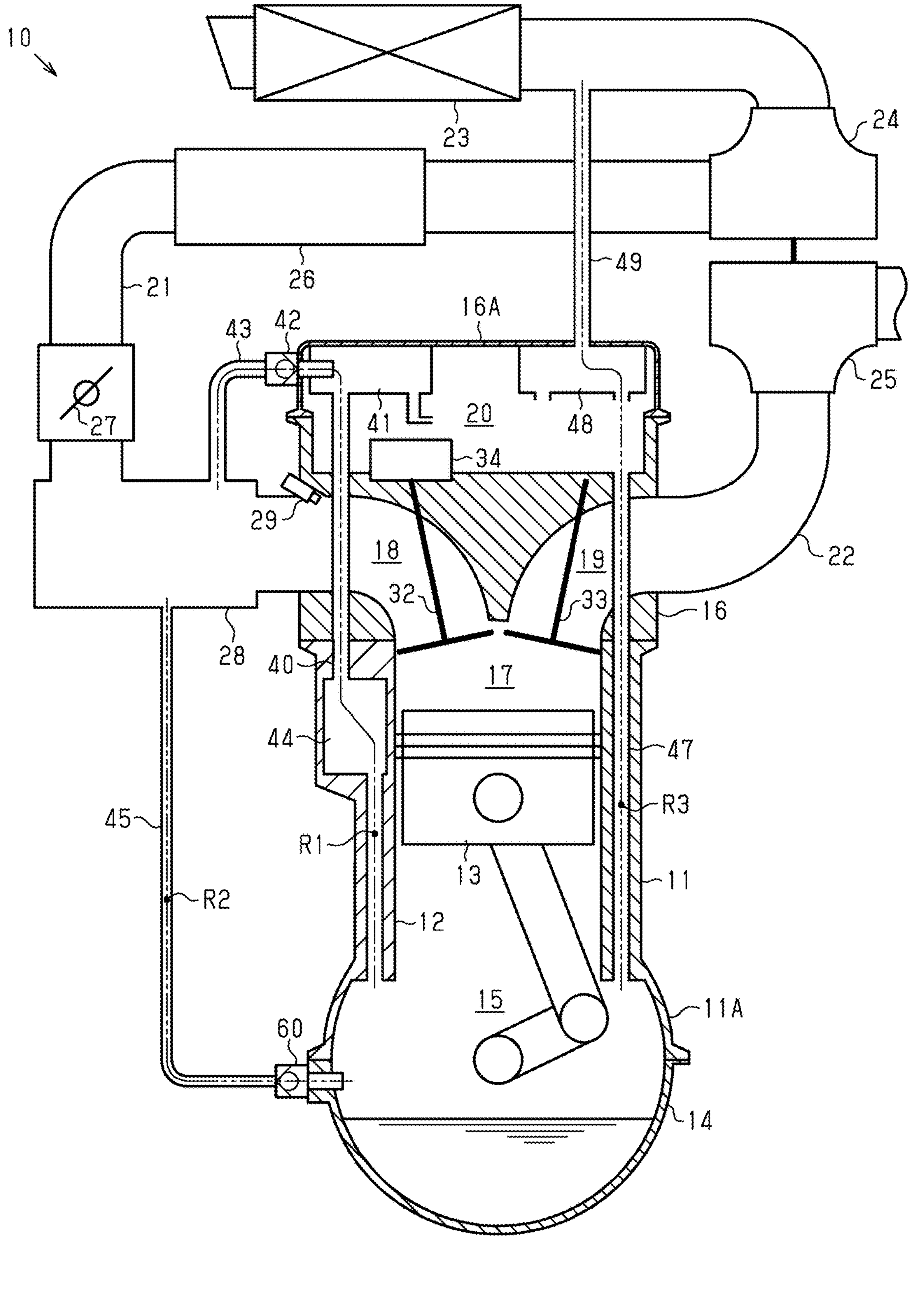
FIG. 1 is a diagram schematically showing a configuration of an engine according to a first embodiment.

Hereinafter, a first embodiment of an engine will be described in detail with reference to FIGS. 1 to 3.

Configuration of Engine 10

First, the configuration of the engine 10 will be described with reference to FIG. 1. The engine 10 shown in FIG. 1 is a hydrogen engine that generates power by burning hydrogen. In hydrogen engines, combustible hydrogen may be included in blow-by gas. Thus, hydrogen engines require higher blow-by gas ventilation performance than gasoline or diesel engines.

The engine 10 includes a cylinder block 11. Cylinders 12 are formed inside the cylinder block 11. FIG. 1 shows only one of the cylinders 12. Each cylinder 12 reciprocally accommodates a piston 13. The portion of the cylinder 12 on the upper side of the piston 13 includes combustion chambers 17 that burn hydrogen. An oil pan 14 that stores oil is attached to the lower part of the cylinder block 11. The portion in the cylinder block 11 on the lower side of the cylinder 12 includes a crankcase 15. A cylinder head 16 is mounted on the upper part of the cylinder block 11. In the cylinder head 16, an intake port 18 and an exhaust port 19 are individually formed for each cylinder 12. A head cover 16A is mounted on the upper side of the cylinder head 16. A valve operating chamber 20 that houses a valvetrain is formed inside the upper part of the cylinder head 16, covered by the head cover 16A.

The engine 10 includes an intake passage 21 through which air is drawn into the combustion chamber 17, and an exhaust passage 22 through which exhaust gas is discharged from the combustion chamber 17. The intake passage 21 includes an air cleaner 23 that filters dust or the like from the air. The portion of intake passage 21 downstream of the air cleaner 23 includes a compressor 24. The compressor 24, together with a turbine 25 disposed in the exhaust passage 22, forms a turbocharger. The portion of the intake passage 21 downstream of the compressor 24 includes an intercooler 26. The intercooler 26 is a heat exchanger used to cool the air that has been heated due to compression by the compressor 24. A throttle valve 27 is disposed in the intake passage 21 downstream of the intercooler 26. The throttle valve 27 regulates the flow rate of air delivered through the intake passage 21 to the combustion chamber 17. The intake passage 21 branches for each cylinder 12 in an intake manifold 28 that is located downstream of the throttle valve 27. The intake manifold 28 is connected to the combustion chamber 17 through the intake port 18.

The engine 10 includes an injector 29 that injects hydrogen into air used for combustion in the combustion chamber 17. In FIG. 1, the injector 29 is disposed to inject hydrogen into the intake port 18. Instead, the injector 29 may be disposed to inject hydrogen into the combustion chamber 17. The engine 10 includes an intake valve 32 that selectively opens and closes the intake port 18 to the combustion chamber 17, and an exhaust valve 33 that selectively opens and closes the exhaust port 19 to the combustion chamber 17.

Ventilation System

The engine 10 includes a ventilation system for the crankcase 15. The ventilation system includes three passages; namely, a first passage R1, a second passage R2, and a third passage R3 as passages that fluidly connect the intake passage 21 to the crankcase 15.

The first passage R1 fluidly connects the crankcase 15 to a portion of the intake passage 21 downstream of the throttle valve 27. The first passage R1 includes a blow-by gas passage 40, a first separator 41, a PCV valve 42, a first PCV hose 43, and a second separator 44. The first separator 41 and the second separator 44 separate oil mist from the blow-by gas flowing through the first passage R1. The first separator 41 is attached to the inner side of the head cover 16A. The blow-by gas passage 40 runs through the cylinder block 11 and the cylinder head 16, connecting the crankcase 15 to the first separator 41. The second separator 44 is located at a portion of the blow-by gas passage 40 within the cylinder block 11. The first PCV hose 43 connects the first separator 41 to the intake manifold 28. The PCV valve 42 permits the flow of gas from the interior of the crankcase 15 to the intake passage 21 through the first passage R1, and restricts the flow of gas from the intake passage 21 to the interior of the crankcase 15 through the first passage R1. The PCV valve 42 is located at a portion of the first PCV hose 43 connected to the first separator 41.

The second passage R2 fluidly connects the crankcase 15 to a portion of the intake passage 21 downstream of the compressor 24. The second passage R2 of FIG. 1 is configured to fluidly connect the intake manifolds 28 to the crankcase 15. The second passage R2 includes a second PCV hose 45 and a unidirectional valve 60. The second PCV hose 45 connects the crankcase 15 to the intake manifold 28. The unidirectional valve 60 permits the flow of air from the intake passage 21 to the crankcase 15 through the second passage R2, and restricts the flow of gas from the crankcase 15 to the intake passage 21 through the second passage R2. In the engine 10 of the present embodiment, the unidirectional valve 60 is attached to the crankcase 15. The structure for attaching the unidirectional valve 60 to the crankcase 15 will be described in detail later.

The third passage R3 fluidly connects the crankcase 15 to a portion of the intake passage 21 upstream of the compressor 24. The third passage R3 includes an oil return passage 47, the valve operating chamber 20, a third separator 48, and a third PCV hose 49. The oil return passage 47 passes through the cylinder block 11 and the cylinder head 16, fluidly connecting the valve operating chamber 20 to the crankcase 15. The oil return passage 47 serves as a passage for recirculating oil from the valve operating chamber 20 to the oil pan 14, and serves as a passage for circulating gas between the valve operating chamber 20 and the crankcase 15. The third separator 48 separates oil mist from the blow-by gas flowing through the third passage R3. The third separator 48 is located on the inner side of the head cover 16A. The third PCV hose 49 connects a portion of the intake passage 21 located downstream of the air cleaner 23 and upstream of the compressor 24 to the third separator 48.

During the naturally aspirated operation of the engine 10, the portion of the intake passage 21 downstream of the throttle valve 27 has a negative pressure. Due to this negative pressure, the blow-by gas in the crankcase 15 is drawn into the intake passage 21 through the first passage R1. In addition, air is introduced into the crankcase 15 through the third passage R3. During the bosting operation of the engine 10, the portion of the intake passage 21 downstream of the compressor 24 has a positive pressure. The air having a positive pressure is introduced into the crankcase 15 from the intake passage 21 through the second passage R2. The introduced air at positive pressure causes the blow-by gas to be pushed out from the crankcase 15 to the intake passage 21 through the third passage R3.

Attachment Structure for Unidirectional Valve 60

In the case of the engine 10 of the present embodiment, the unidirectional valve 60, which restricts the flow direction of gas in the second passage R2 is directly attached to the crankcase 15. The attachment structure for the unidirectional valve 60 to the crankcase 15 will now be described with reference to FIGS. 2 to 3. FIG. 2 is a side view of the oil pan 14 of the engine 10 and the vicinity of the oil pan 14. FIG. 3 shows a cross-sectional structure of the valve housing 50 and the vicinity of the valve housing 50 taken along line 3-3 of FIG. 2. In the following description, the state of the engine 10 in which the vehicle on which the engine 10 is mounted is stationary on a horizontal plane will be referred to as the state in which the engine 10 is mounted on the vehicle. Further, in the state in which the engine 10 is mounted on the vehicle, the liquid level of an engine oil inside the crankcase 15 when the engine oil is injected into the engine 10 by an amount corresponding to an upper limit of a proper range is referred to as a reference oil level SO.

Figure 2:
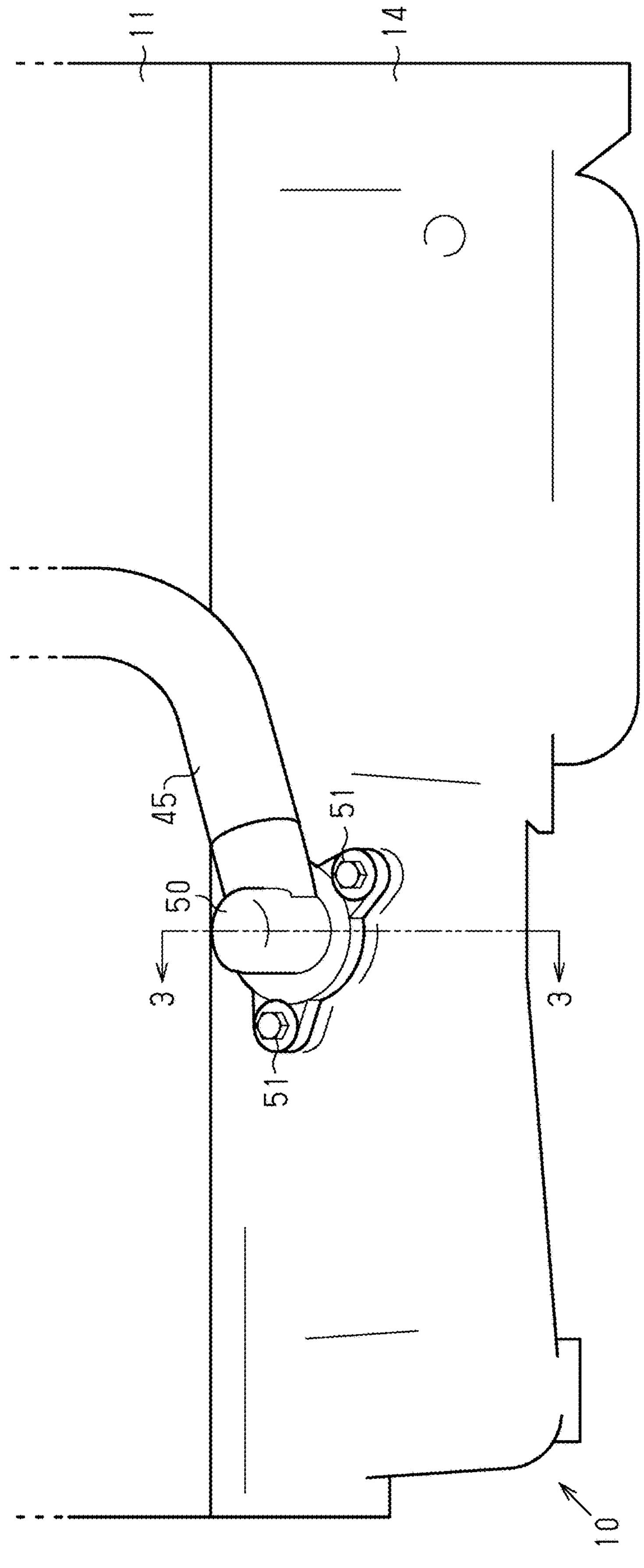
FIG. 2 is a side view showing an oil pan of the engine and the vicinity of the oil pan.

As shown in FIG. 2, the engine 10 includes the valve housing 50 for attaching the unidirectional valve 60 to the crankcase 15. The valve housing 50 is fixed to the outer wall of the oil pan 14 using bolts 51. In FIG. 2, the valve housing 50 is fixed using two bolts 51. The valve housing 50 may be fixed using one bolt 51 or may be fixed three or more bolts 51. Further, the valve housing 50 may be fixed to the crankcase 15 using a method other than the bolts 51.

Figure 3:
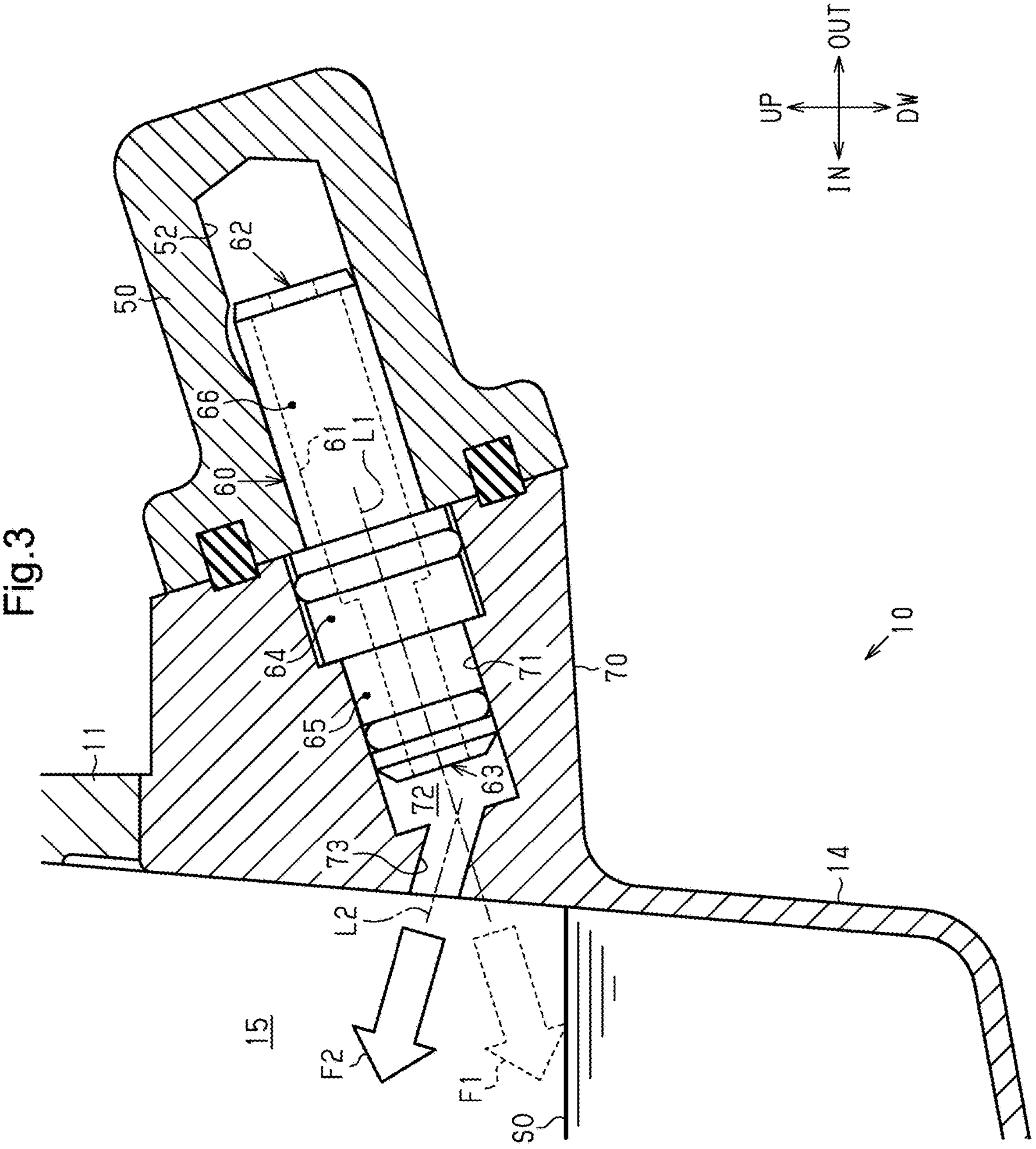
FIG. 3 is a cross-sectional view showing a cross-sectional structure of the valve housing of the engine and the vicinity of the valve housing taken along line 3-3 of FIG. 2.

As shown in FIG. 3, the unidirectional valve 60 has the shape of a substantially circular tube having a through-hole 61 extending from one end to the other. The one end of the through-hole 61 serves as an inlet 62 for air flowing from the intake passage 21. The other end of the through-hole 61 serves as an outlet 63 for air to the interior of the crankcase 15. In addition, the unidirectional valve 60 includes a flange 64 having a larger outer diameter than other portions. In the following description, the portion of the unidirectional valve 60 that extends from the flange 64 toward the outlet 63 is referred to as a front end portion 65. The portion of the unidirectional valve 60 that extends from the flange 64 toward the inlet 62 is referred to as a rear end portion 66.

The unidirectional valve 60 includes a check mechanism (not shown). The check mechanism allows the flow of gas from the inlet 62 to the outlet 63 through the through-hole 61, and restricts the flow of gas from the outlet 63 to the inlet 62. The check mechanism may be, for example, a well-known mechanism including a valve member and a biasing member (e.g., a spring) that biases the valve member.

A boss 70 is provided at the portion of the oil pan 14 where the unidirectional valve 60 and the valve housing 50 are mounted. The boss 70 has an insertion hole 71 into which the front end portion 65 and the flange 64 of the unidirectional valve 60 are inserted. The insertion hole 71 extends downward from the outside toward the inside of the crankcase 15 when the engine 10 is mounted on the vehicle. The unidirectional valve 60 is attached to the crankcase 15, with the flange 64 and the front end portion 65 inserted into the insertion hole 71. The unidirectional valve 60 is partially inserted into the insertion hole 71 so that a space is defined by the unidirectional valve 60 in the inner part of the insertion hole 71. In the following description, this space is referred to as an auxiliary chamber 72. Further, the oil pan 14 includes a coupling passage 73 that fluidly connects the interior of the crankcase 15 to the auxiliary chamber 72. The air discharged from the outlet 63 of the unidirectional valve 60 is introduced into the crankcase 15 through the auxiliary chamber 72 and the coupling passage 73. The coupling passage 73 guides, into the crankcase 15, the air discharged from the unidirectional valve 60. In the inner wall surface of the crankcase 15, the coupling passage 73 opens in a portion located above the reference oil level SO in the state in which the engine 10 is mounted on the vehicle.

In the following description, the upper side in the vertical direction in the state in which the engine 10 is mounted on the vehicle is referred to as a mounting upper side UP, and the lower side in the vertical direction is referred to as a mounting lower side DW. The horizontal direction in the cross-section shown in FIG. 3 in the state in which the engine 10 is mounted on the vehicle will be referred to as a mounting horizontal direction. The direction from the outside to the inside of the crankcase 15 in the mounting horizontal direction in the cross-section shown in FIG. 3 will be referred to as a case inner side IN, and the direction from the inside to the outside of the crankcase 15 will be referred to as a case outer side OUT.

In FIG. 3, the center axis L1 of the insertion hole 71 and the center axis L2 of the coupling passage 73 are shown by the alternate long and short dashed lines. The coupling passage 73 extends in a direction that is different from that of the insertion hole 71. Specifically, the insertion hole 71 extends in a direction inclined with respect to the mounting horizontal direction such that a portion of the insertion hole 71 on the case inner direction IN is located on the mounting lower side DW with respect to a portion of the insertion hole 71 on the case outer side OUT. The coupling passage 73 extends in a direction inclined with respect to the mounting horizontal direction such that a portion of the insertion hole 71 on the case inner direction IN is located on the mounting upper side UP with respect to a portion of the insertion hole 71 on the case outer side OUT. The unidirectional valve 60 is inserted into the insertion hole 71 in an orientation in which the discharge direction of the air from the outlet 63 is the same as the direction in which the insertion hole 71 extends. Thus, in a state in which the unidirectional valve 60 is coupled, the coupling passage 73 extends in a direction that is different from a direction in which air is discharged from the unidirectional valve 60.

Operation of Embodiment

The engine 10 is configured to perform ventilation of blow-by gas by introducing air from the intake passage 21 into the crankcase 15. The engine 10 includes the second passage R2, which fluidly connects the intake passage 21 to the crankcase 15. The second passage R2 serves as an air introduction passage for introducing air into the crankcase 15 during the boosting operation. The engine 10 further includes the unidirectional valve 60, which restricts the flow of gas from the crankcase 15 toward the intake passage 21 through the second passage R2. That is, the unidirectional valve 60 prevents backflow of blow-by gas to the intake passage 21 through the second passage R2.

The unidirectional valve 60 is disposed at the portion exposed to the blow-by gas based in its functionality. Blow-by gas contains oil and moisture. When the temperatures of the unidirectional valve 60 and its surroundings are relatively low, the moisture in the blow-by gas is condensed and liquefied. Then, the condensed water may mixed with oil so that emulsion may occur. In a low-temperature environment, when the engine 10 is stopped in a state in which condensed water remains in the unidirectional valve 60, the remaining water may freeze while the engine 10 is stationary. In this case, the unidirectional valve 60 may not operate properly until the ice melts during the next operation of the engine 10.

The unidirectional valve 60 of the engine 10 of the present embodiment is directly attached to the crankcase 15. Specifically, the engine 10 includes the valve housing 50, which is fixed to the outer wall of the crankcase 15. The unidirectional valve 60 is sandwiched between the crankcase 15 and the valve housing 50 and attached to the crankcase 15. Heat generated by combustion in the engine 10 is directly transmitted to the unidirectional valve 60 through the crankcase 15. Therefore, even immediately after the cold start, the unidirectional valve 60 is quickly warmed by the heat received from the crankcase 15. Thus, the occurrence of emulsion and freezing in the unidirectional valve 60 is suppressed.

If the unidirectional valve 60 is directly attached to the crankcase 15, the position and/or orientation of the unidirectional valve 60 coupled to the crankcase 15 may be limited due to, for example, interference with and/or coupling efficiency of the surrounding components. In the present embodiment, the unidirectional valve 60 is attached to the crankcase 15 such that the outlet 63 faces obliquely downward. Arrow F1, shown by the chain line in FIG. 3, indicates the discharge direction of air from the outlet 63 of the unidirectional valve 60 attached in this manner. If the air is directly discharged from the outlet 63 of the unidirectional valve 60 into the crankcase 15, the air is directly blown to the engine oil so that the oil surface becomes wavy. This may increase the aeration rate of the engine oil. Also, the blowing of air may increase the amount of engine oil that is atomized. Some of the atomized engine oil atomized returns to the intake air together with blow-by gas and burns in the combustion chamber 17. This may increase the amount of engine oil consumed.

The engine 10 of the present embodiment includes the coupling passage 73, which guides, into the crankcase 15, the air discharged from the unidirectional valve 60. The coupling passage 73 extends in the direction that is different from the direction in which air is discharged from the unidirectional valve 60. Specifically, the coupling passage 73 extends in a direction in which the distance from the reference oil level SO increases from the case outer side OUT toward the case inner side IN. The air discharged from the outlet 63 of the unidirectional valve 60 flows into the crankcase 15 through the coupling passage 73. Arrow F2, shown by the solid line in FIG. 3, indicates a discharge direction of air from the coupling passage 73 into the crankcase 15. The discharge direction of the air from the coupling passage 73 into the crankcase 15 is a direction away from the oil level. Hence, in the engine 10 of the present embodiment, blowing of the air discharged from the unidirectional valve 60 to the engine oil is suppressed.

Advantages of Embodiment

The engine 10 of the present embodiment provides the following advantages.

(1) The engine 10, which introduces air from the intake passage 21 into the crankcase 15 to ventilate the blow-by gas, includes the second passage R2. The second passage R2 serves as the air introduction passage, which fluidly connects the intake passage 21 to the crankcase 15. The engine 10 further includes the unidirectional valve 60, which restricts the flow of gas from the crankcase 15 toward the intake passage 21 through the second passage R2. The unidirectional valve 60 is directly attached to the crankcase 15. Specifically, the engine 10 includes the valve housing 50, which is fixed to the outer wall of the crankcase 15. The unidirectional valve 60 is sandwiched between the crankcase 15 and the valve housing 50 and attached to the crankcase 15. In the engine 10, the unidirectional valve 60 is quickly warmed by the heat received from the crankcase 15. Thus, the occurrence of emulsion and freezing in the unidirectional valve 60 that would result from cold temperatures is suppressed.

(2) The engine 10 includes the coupling passage 73, which guides, into the crankcase 15, the air discharged from the unidirectional valve 60. The coupling passage 73 extends in the direction that is different from the direction in which air is discharged from the unidirectional valve 60. Accordingly, the discharge direction of the air into the crankcase 15 is different from the discharge direction of the air from the unidirectional valve 60. This allows the discharge direction of the air into the crankcase 15 to be set regardless of the direction in which the unidirectional valve 60 is attached.

(3) The outer wall of the crankcase 15 has the insertion hole 71, into which the unidirectional valve 60 is inserted. In the state in which the engine 10 is mounted on the vehicle, the insertion hole 71 extends in the direction in which the portion of the insertion hole 71 located inside the crankcase 15 is located below the portion of the insertion hole 71 located outside the crankcase 15. Air is discharged obliquely downward from the unidirectional valve 60 inserted into the insertion hole 71 and attached to the crankcase 15. Thus, when air is directly discharged from the unidirectional valve 60 into the crankcase 15, the air is readily blown to the oil surface. In the engine 10 of the present embodiment, air is introduced into the crankcase 15 through the coupling passage 73, which extends in the direction different from the discharge direction of the air from the unidirectional valve 60. Specifically, in the state in which the engine 10 is mounted on the vehicle, the coupling passage 73 extends in the direction in which the end of the coupling passage 73 on the side opening into the crankcase 15 is located above the end of the coupling passage 73 on the opposite side. This suppresses the blowing of air to the engine oil. As a result, an increase in the aeration rate of the engine oil and the carry-away of the engine oil are suppressed.

Second Embodiment

The engine according to a second embodiment of the present disclosure will now be described with reference to FIG. 4. In the present embodiment, the same reference numerals are given to those components that are the same as the corresponding components of the above-described embodiment. Such components will not be described in detail.

Figure 4:
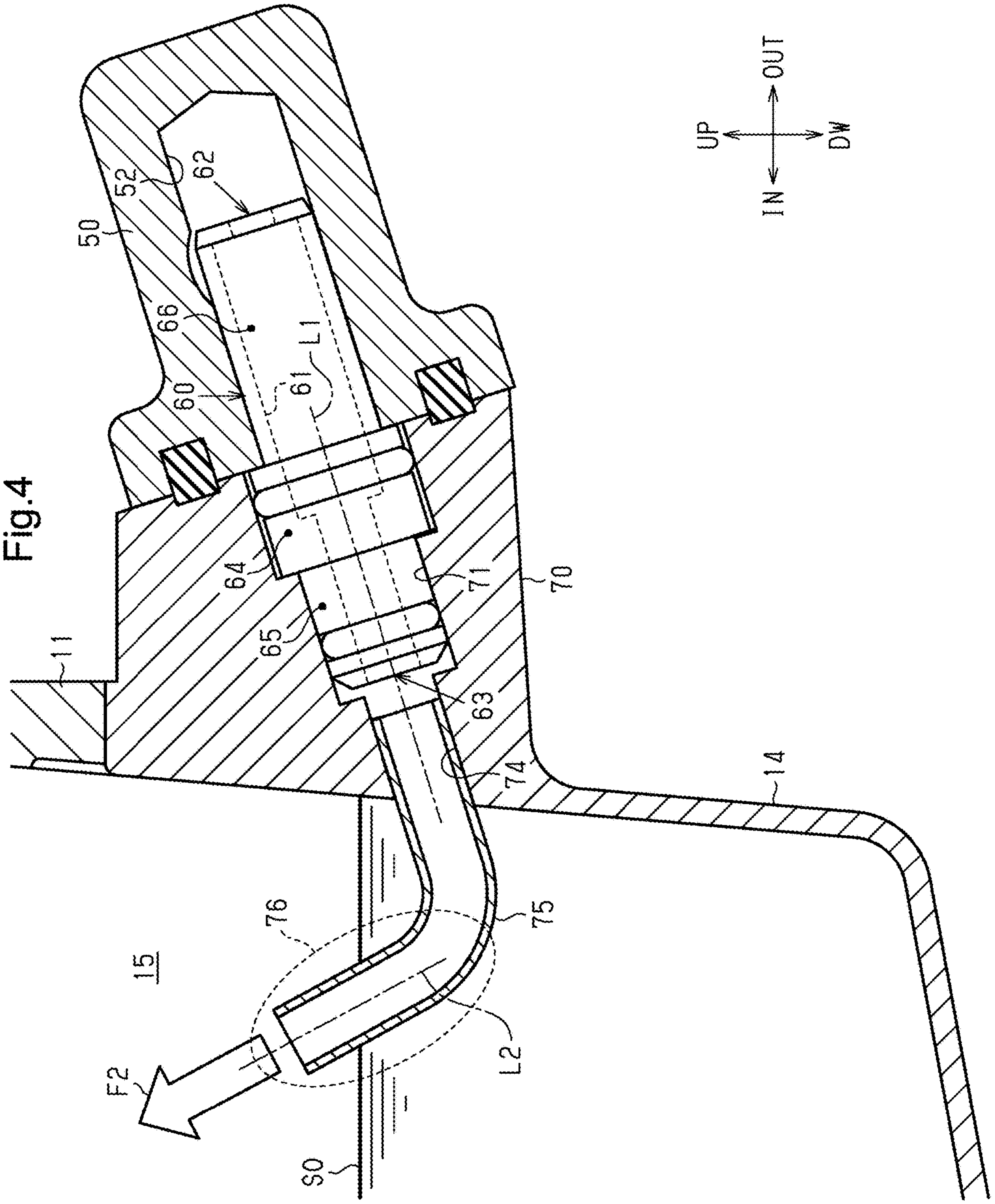
FIG. 4 is a cross-sectional view of the unidirectional valve of the engine according to a second embodiment and the vicinity of the unidirectional valve.

FIG. 4 shows a cross-sectional structure of the unidirectional valve 60 and its vicinity in the engine of the present embodiment. The cross-section shown in FIG. 4 corresponds to the cross-section of the engine 10 of the first embodiment shown in FIG. 3. In the engine of the present embodiment, the air discharged from the unidirectional valve 60 is introduced into the crankcase 15 through a curved pipe 75 that is installed inside the crankcase 15.

In the engine of the present embodiment, the boss 70 of the oil pan 14 has a attachment hole 74 that fluidly connects the insertion hole 71, into which the unidirectional valve 60 is inserted, and the interior of the crankcase 15. The attachment hole 74 is coaxial with the insertion hole 71. The curved pipe 75 is inserted into the attachment hole 74 and attached to the crankcase 15. In FIG. 4, the opening of the attachment hole 74 into the crankcase 15 is located below the reference oil level SO.

In the following description, the end portion of the curved pipe 75 on the side in which the curved pipe 75 is inserted into the attachment hole 74 will be referred to as a basal end portion of the curved pipe 75. The end portion of the curved pipe 75 opposite to the basal end portion will be referred to as a distal end portion of the curved pipe 75. The distal end portion of the curved pipe 75 extends obliquely upward with respect to the reference oil level SO and protrudes upward from the reference oil level SO. In the engine of the present embodiment, the distal end portion of the curved pipe 75 serves as a coupling passage 76 extending in a direction that is different from the discharge direction of air from the unidirectional valve 60.

In the engine of the present embodiment, the discharge direction of air from the crankcase 15 is changed by the curved pipe 75. Thus, the engine of the present embodiment provides the same advantages as the first embodiment.

In the state in which the engine of the present embodiment is mounted on the vehicle, the outlet 63 for air from the unidirectional valve 60 is located below the reference oil level SO. The opening of the coupling passage 76 into the crankcase 15 is located above the reference oil level SO. Thus, even when the unidirectional valve 60 is attached such that the outlet 63 is located below the reference oil level SO, the engine oil is less likely to flow into the unidirectional valve 60.

Modifications

The above-described embodiments may be modified as described below. The above-described embodiments and the following modifications can be combined as long as the combined modifications remain technically consistent with each other.

In each of the above-described embodiments, the coupling passage 73 or 76 is provided to set the discharge direction of the air into the crankcase 15 to the direction different from the direction in which air is discharged from the unidirectional valve 60, thereby suppressing the blowing of the air to the oil surface. The coupling passage 73 or 76 may be provided for other purposes. For example, the coupling passage 73 or 76 may be provided to improve the ventilation efficiency of the crankcase 15. The ventilation efficiency of the crankcase 15 varies depending on the discharge position and discharge direction of the air into the crankcase 15. When air is directly discharged from the unidirectional valve 60 into the crankcase 15, the air may not be introduced into the crankcase 15 in a manner suitable for ventilation depending on the mounting position and the mounting orientation of the unidirectional valve 60. Even in such a case, a coupling passage extending in the direction different from the air discharge direction of the unidirectional valve 60 may be provided to introduce air into the crankcase 15 in a manner suitable for ventilation. The direction in which the coupling passage extends in this case may be different from those of the above-described embodiments.

The unidirectional valve 60 may be attached to a skirt portion of the cylinder block 11 that forms the outer wall of the crankcase 15.

In the engine of the above-described embodiments, the unidirectional valve 60 is sandwiched between the crankcase 15 and the valve housing 50 and attached to the crankcase 15. The unidirectional valve 60 may be attached to the crankcase 15 using other methods.

If the ventilation system for the engine 10 includes the second passage R2 with the unidirectional valve 60, the ventilation system may be changed. For example, when the ventilation of the crankcase 15 does not have to be performed during the naturally aspirated operation, the first passage R1 may be omitted.

The engine 10 is not limited to a hydrogen engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An engine configured to perform ventilation of blow-by gas by introducing air from an intake passage into a crankcase, the engine comprising:

an air introduction passage that fluidly connects the intake passage to the crankcase;

a unidirectional valve attached to the crankcase and configured to restrict a flow of gas from the crankcase toward the intake passage through the air introduction passage;

a coupling passage that guides, into the crankcase, air discharged from the unidirectional valve, wherein the coupling passage extends in a direction different from a direction in which air is discharged from the unidirectional valve;

wherein in a state in which the engine is mounted on a vehicle, a liquid level of an engine oil inside the crankcase when the engine oil is injected into the engine by an amount corresponding to an upper limit of a proper range is referred to as a reference oil level, and in the state in which the engine is mounted on the vehicle, an outlet for air from the unidirectional valve is located below the reference oil level, and an opening of the coupling passage into the crankcase is located above the reference oil level.

2. The engine according to claim 1, wherein in a state in which the engine is mounted on a vehicle, the coupling passage extends in a direction in which an end of the coupling passage on a side opening into the crankcase is located above an end of the coupling passage on an opposite side.

3. The engine according to claim 2, wherein an outer wall of the crankcase has an insertion hole into which the unidirectional valve is inserted, and in the state in which the engine is mounted on the vehicle, the insertion hole extends in a direction in which a portion of the insertion hole located inside the crankcase is located below a portion of the insertion hole located outside the crankcase.

4. The engine according to claim 1, further comprising a valve housing fixed to an outer wall of the crankcase, wherein the unidirectional valve is sandwiched between the crankcase and the valve housing and attached to the crankcase.

* * * * *